Patented Nov. 13, 1923.

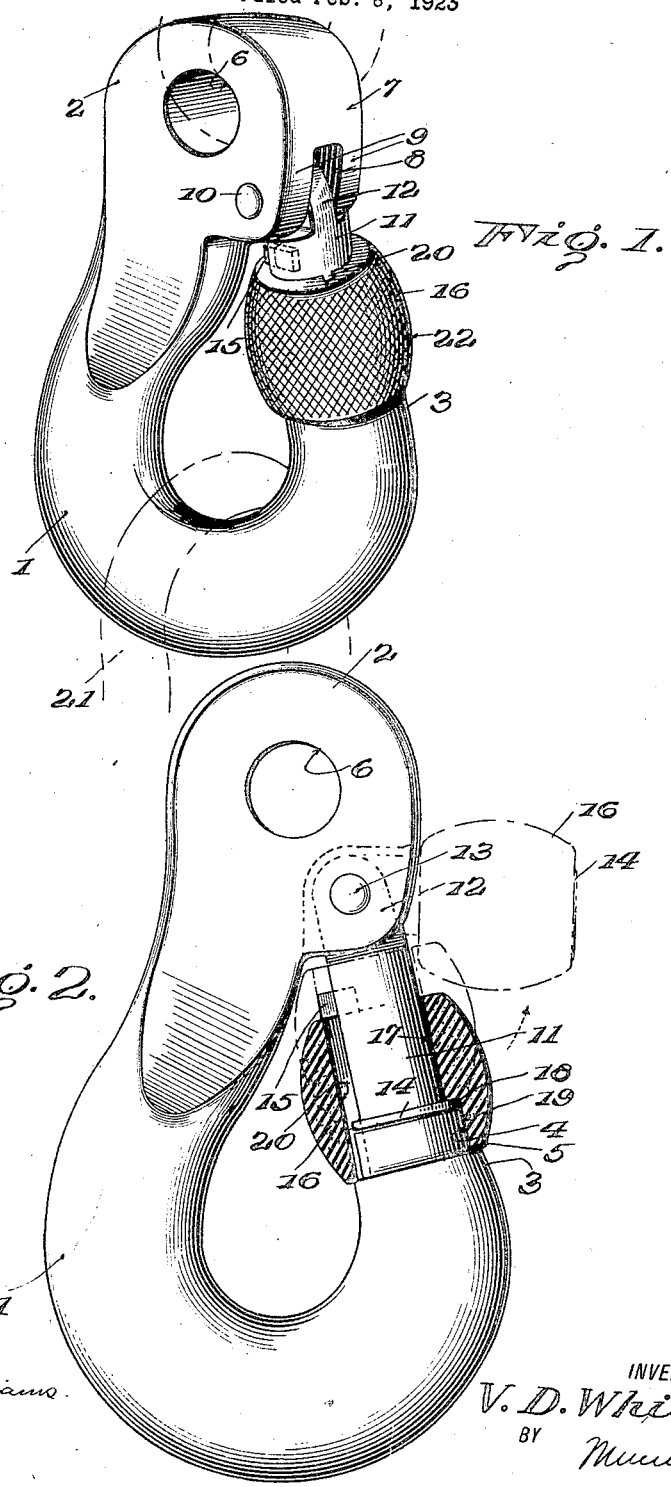

1,473,983

UNITED STATES PATENT OFFICE.

VIRGIL DOLPHINEOUS WHITE, OF COTTAGE GROVE, OREGON, ASSIGNOR OF ONE-HALF TO WALTER A. WOODWARD, OF COTTAGE GROVE, OREGON.

SAFETY BUTT HOOK.

Application filed February 8, 1923. Serial No. 617,816.

*To all whom it may concern:*

Be it known that I, VIRGIL D. WHITE, a citizen of the United States, and resident of Cottage Grove, in the county of Lane and State of Oregon, have invented certain new and useful Improvements in Safety Butt Hooks, of which the following is a specification.

My invention relates to improvements in safety hooks which are adapted for use in logging, mining and like operations, and it consists in the combinations, constructions and arrangements herein described and claimed.

An object of the invention is to improve the construction of safety hooks of the class described in such manner as to provide a hook of extremely simple construction which will be strong and durable and highly efficient in the service for which intended.

A further object of the invention is to provide a hook of the character described which includes no detachable elements, such as nuts, and bolts, cotter pins, springs, triggers, but which includes means carried by the body and operable at will to effect closing or opening of the space between the bill point and body proper of the hook.

Other objects and advantages will be apparent from the following description, considered in conjunction with the accompanying drawings, in which Figure 1 is a perspective view, showing the improved hook closed, and Figure 2 is a side elevation of the hook with a portion of the closing means shown in section, showing also in dotted lines the position of the closing means when the hook is open.

A hook embodying the invention in the form now preferred by me comprises a body consisting of a shank 1 curved as shown and merged at one end into a relatively enlarged flat head portion 2, the shank being bent to provide at its other end a bill 3 which is reduced diametrically adjacent to its extremity, as indicated at 4, thus defining an annular shoulder 5 at the inner end of the reduced portion. The flat head portion 2 is provided with a transverse bore 6 adapted to receive a clevis pin, a portion of a chain link or like suspension element. The head portion 2 is enlarged laterally as indicated at 7. The enlargement 7 has a recess 8 formed in its lower part, thereby providing a pair of spaced apart ears or lugs 9 which have aligned transverse apertures 10 formed therethrough, the axis of the apertures 10 intersecting the axial line of the reduced end portion 4 of the bill.

The closing means comprises an arm or latch member having a straight body portion 11 of circular cross sectional contour provided at one end with a tongue portion 12 insertable between the ears 9 and swingingly supported on the latter through the agency of a pivot pin or pintle 13 which is projected through the apertures 10 and through an aperture in the tongue 12 which is in alignment with the apertures 10. The pivot pin or pintle 13 may be a rivet or other pin secured against displacement from the ears by having the ends thereof upset or in any other suitable known manner.

The arm or latch member 11 is provided with an annular flange or bead 14 at its free end. A key or projection 15 extends radially from the body of the latch member 11 at a determined distance from the free end thereof. A locking sleeve 16 has a bore 17 of such diameter as to adapt the sleeve to slide and rotate on the body of the latch member. The bore 17 is merged by an annular shoulder 18 at a determined distance from one end of the sleeve into a counter-bore 19 which is adapted to receive the flange 14 and the reduced portion 4 of the hook bill when the latch member 11 is positioned in axial alignment with the reduced portion of the bill as illustrated in Figure 1 and by the full lines in Figure 2. The flange 14 and the reduced portion 4 are approximately equal diametrically and the length of the latch member 11 is such as to position the free end of the latter in close proximity to the end of the reduced portion 4 when the latch member has been swung into axial alignment with the end portion of the bill.

The locking sleeve 16 has a groove or keyway extending in its inner wall longitudinally thereof the entire length of the sleeve and adapted to receive the key 15 whereby the sleeve 16 may be moved longitudinally of the latch member when the latter has been rotated to the position shown by the full lines in Figure 2 and the key 15 is in position to enter the groove or key-way 20. The locking sleeve 16 may then be moved from the position indicated by full lines in Figure 3 to the position indicated by the dotted lines on the latch member 11, thereby withdrawing the sleeve from overlapping relation to the reduced end portion 4 of the bill and permitting swinging movement of the latch member 11 and sleeve 16 as a unit outwardly and upwardly to the dotted line position of Figure 2. When the key 15 is out of engagement with the key way 20, it will engage with one end of the sleeve to hold the latter against movement longitudinally of the latch member 11 whereby the locking sleeve 16 may be releasably held in the position indicated by the full lines in Figure 2 and accidental displacement of the latch member 11 from closed position thus prevented. When the sleeve 16 has been rotated until the keyway 20 and key 15 are in alignment, the sleeve may be moved longitudinally of the latch member to disengage the reduced end portion 4 of the bill. It of course will be understood that the sleeve 16 is slipped over the tongue 12 before the latch member 11 is attached to the ears 9 in the manner described and that the shoulder 18 will abut the flange or bead 14 to limit the movement of the sleeve longitudinally of the latch member. Moreover, the length of the counter-bore 19 is approximately equal to the combined length of the flange 14 and reduced portion 4 of the bill so that the end of the sleeve 16 will contact the shoulder 5 when the shoulder 18 is in contact with the flange 14.

From the foregoing description of the various parts of the device, the operation thereof may be readily understood. The closing means described includes no part detachable from the hook proper and in consequence a hook embodying the invention is not likely to get out of order easily. The locking sleeve 16 may be manipulated conveniently to engage with the reduced end portion 4 of the bill so that the latch will be held against movement from closed position or to disengage the reduced portion 4 of the bill so that the latch member may be swung to open position to permit a chain link 21 or like element to be moved into or out of engagement with the body of the hook. The locking sleeve 16 is held in engagement with the reduced end portion 4 of the bill when the key 15 is in abutting relation to one end wall of the locking sleeve, as stated. The locking sleeve 16 is preferably, although not necessarily, formed with the external surface thereof knurled as indicated at 22 so that it may be firmly gripped between the fingers and manipulated.

It is to be observed at this point that the locking sleeve 16 is considerably larger diametrically intermediate its ends than at any other point along its length and that it decreases gradually in diameter from its transverse median line to its ends. The intermediate portion of the sleeve 16 therefore extends in proximity to the hook shank and serves to prevent the chain link or element carried by the hook from moving between the locking sleeve and shank of the hook into contact with the latch member 11 or into the space between the upper end of the locking sleeve and the shank of the hook, whereby interference of the elements carried by the hook with the operation of the closing means which has been described is precluded. The key-way 20 extends the entire length of the sleeve and should foreign matter lodge therein, such matter may be ejected from the key way without difficulty and ordinarily will be pushed out of the key way by the key 15 when the sleeve is moved longitudinally of the latch member.

Obviously, my invention is susceptible of embodiment in forms other than that illustrated in the accompanying drawings and I therefore consider as my own all modifications and adaptations of the form of the device herein illustrated and described which may fairly fall within the scope of the appended claims.

I claim:—

1. In a safety hook, a body having a bill portion, a pivoted latch member carried by the body for closing the space between the latter and the end of the bill, said latch member having an external flange at its free end, a locking sleeve having a bore slidably and rotatably receiving the latch member and having a counterbore receiving said flange and the end portion of said bill, said sleeve having a longitudinally extending groove in its inner wall, and a radial projection on the latch member for engaging the end of the sleeve remote from the bill and to then hold the sleeve in engagement with the bill, said radial projection being adapted to enter said groove when said sleeve has been rotated to a certain position so that the sleeve may then be moved longitudinally of the latch member out of engagement with the bill.

2. A safety hook comprising a body having a shank portion formed with a head portion at one end and with a bill at the other end thereof, said head portion having an enlargement in confronting relation to the end of the bill and said bill having the end portion thereof reduced diametrically, said enlargement being fashioned to provide a pair of spaced apart ears, a latch member having a tongue portion at one end insertable between said ears and being swingingly attached to the latter so that said latch member may be swung to and from position to close the space between the end of the bill and the enlargement and in axial alignment with the end portion of the bill, said latch member being circular in cross sectional contour and having a flange at the free end thereof equal diametrically to the reduced end portion of the bill, a sleeve having a bore adapted to slidably and rotatably receive said latch member and having a counter-bore adapted to receive said flange and said reduced end portion of the bill, said sleeve having a longitudinal groove in its inner wall extending the entire length thereof, and a radial projection on the latch member in position to engage with the end of the locking sleeve remote from the bill when the locking sleeve is in overlapping relation to the reduced end portion of the bill to releasably hold said locking sleeve against movement longitudinally of the latch member, said projection being adapted to enter said groove in the inner wall of the sleeve when the latter has been rotated to a certain position to permit longitudinal movement of the sleeve out of engagement with the reduced end portion of the bill.

3. A safety hook comprising a body having a shank portion formed with a head portion at one end and with a bill at the other end, said head portion having an enlargement in confronting relation to the end of the bill and said bill having the end portion thereof reduced diametrically, said enlargement being fashioned to provide a pair of spaced apart ears, a latch member having a tongue portion at one end insertible between said ears and being swingingly attached to the latter so that said latch member may be swung to and from position to close the space between the end of the bill and the enlargement and in axial alignment with the end portion of the bill, said latch member being circular in cross sectional contour and having a flange at the free end thereof equal diametrically to the reduced end portion of the bill, a sleeve having a bore adapted to slidably and rotatably receive said latch member and having a counter-bore adapted to receive said flange and said reduced end portion of the bill, said sleeve having a longitudinally extending groove in its inner wall extending the entire length thereof, and a radial projection on the latch member in position to engage with the end of the locking sleeve remote from the bill when the locking sleeve is in overlapping relation to the reduced end portion of the bill to releasably hold said locking sleeve against movement longitudinally of the latch member, said projection being adapted to enter said groove in the inner wall of the sleeve when the latter has been rotated to a certain position to permit longitudinal movement of the sleeve out of engagement with the reduced end portion of the bill, the transverse area of said locking sleeve being greatest intermediate its ends and decreasing regularly toward its ends.

VIRGIL DOLPHINEOUS WHITE.